United States Patent [19]

Wadell

[11] Patent Number: 5,165,942
[45] Date of Patent: Nov. 24, 1992

[54] MACHINE FOR FORMING A PIZZA SHELL

[75] Inventor: Lars G. A. Wadell, Aengelholm, Sweden

[73] Assignee: Nestec S.A., Vevey, Switzerland

[21] Appl. No.: 719,966

[22] Filed: Jun. 24, 1991

[30] Foreign Application Priority Data

Aug. 6, 1990 [EP] European Pat. Off. ........ 90115057.3

[51] Int. Cl.⁵ ...................... A21C 11/02; B29C 43/04
[52] U.S. Cl. .................................... 425/394; 425/412; 425/432; 425/456
[58] Field of Search ............... 425/383, 348, 353, 394, 425/432, 456, 353, 412; 99/450.1, 450.3, 450.6

[56] References Cited

U.S. PATENT DOCUMENTS

| 589,260 | 8/1897 | Hulbert | 425/394 |
|---|---|---|---|
| 2,361,463 | 10/1944 | Dorton | 81/3.41 |
| 2,896,555 | 7/1959 | Marcus et al. | 425/412 |
| 4,005,967 | 2/1977 | Ayres et al. | 425/412 |
| 4,417,867 | 11/1983 | Bauer | 425/394 |

Primary Examiner—Willard Hoag
Attorney, Agent, or Firm—Vogt & O'Donnell

[57] ABSTRACT

A machine for forming a pizza shell from a dough mass has a vertically reciprocable pressing head positioned above a base plate. Positioned around the circumference of the pressing head are a plurality of spaced fingers capable of reciprocating vertically and laterally. The lower ends of the fingers are adapted to press against the border of a pizza shell on the base plate to imitate manual fingertip pressure.

8 Claims, 1 Drawing Sheet

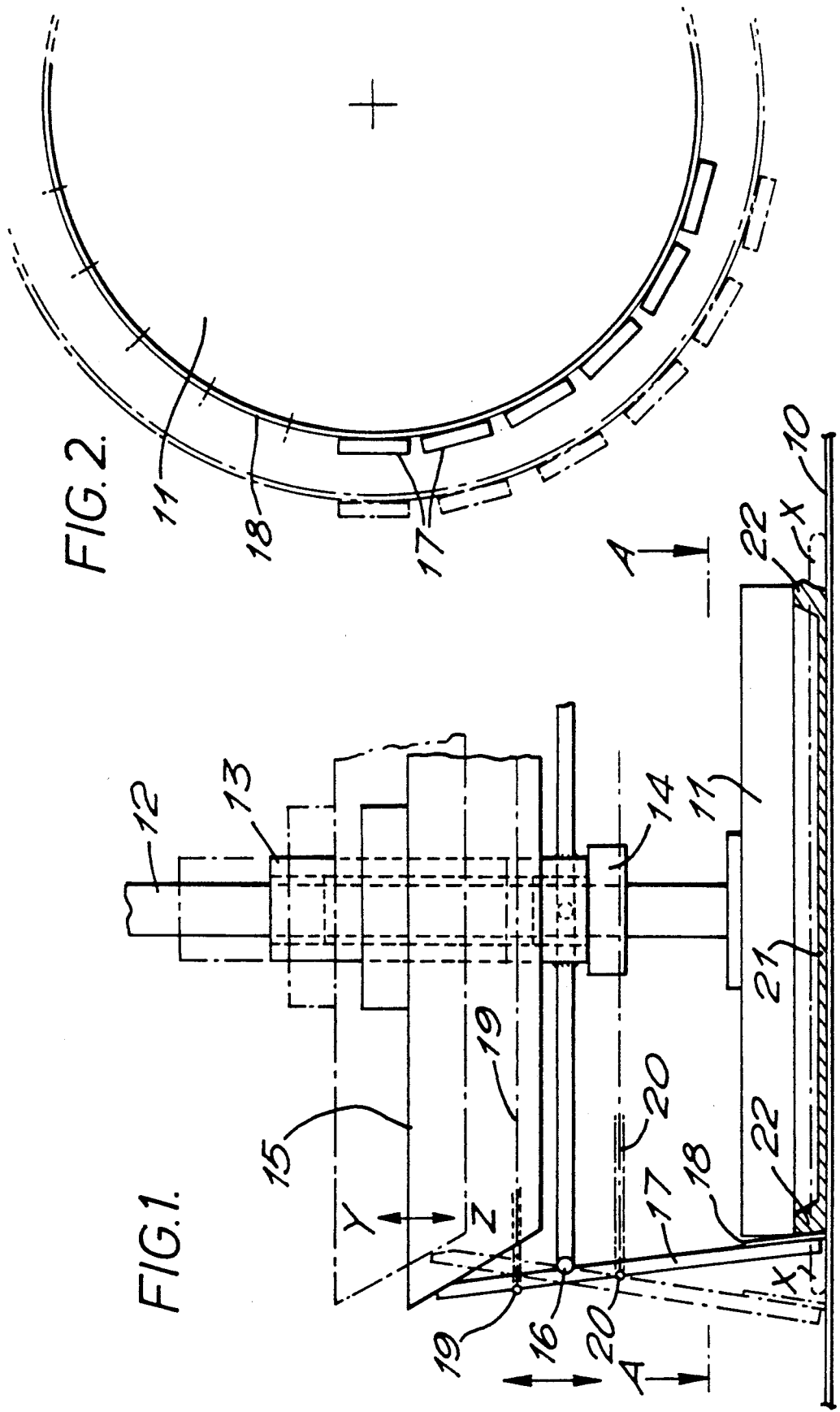

MACHINE FOR FORMING A PIZZA SHELL

BACKGROUND OF THE INVENTION

The present invention relates to a machine and method for preparing pizza, more particularly for forming a pizza shell from a dough mass.

The attractive depressions around the border of a pizza shell are usually done manually by fingertip pressure which is not only labour consuming but can also be unhygienic.

SUMMARY OF THE INVENTION

An automatic mechanical means has been devised for imitating manual fingertip pressure around the border of a pizza shell.

DETAILED DESCRIPTION OF THE INVENTION

Accordingly, the present invention provides a machine for forming a pizza shell from a dough mass comprising a vertically reciprocating pizza pressing head positioned above a base plate, and positioned around the circumference of the pressing head are a plurality of spaced fingers capable of reciprocating vertically and laterally, the lower ends of which are adapted to press against the border of a pizza shell on the base plate to imitate manual fingertip pressure.

The number of fingers is not critical, but for a normal sized pizza, there may be from for example 15 to 30 fingers.

Advantageously, an elastic band is positioned around the circumference of the pizza pressing head the lower edge of which contacts the base plate when the pressing head, is in its descended position to prevent escape of pizza dough beyond the circumference of the pressing head. The band is preferably made of rubber.

Conveniently, the machine is automatic with a conveyor belt serving as a base plate which passes beneath the pizza pressing head which is synchronised to descend to press the pizza dough mass into pizza shells. The conveyor belt may be intermittently travelling so that the pizza pressing head descends when the conveyor belt is stationary, or the conveyor belt may be continuously travelling and the pizza pressing head may be "flying" so that the conveyor belt does not have to stop when the pressing head descends.

The reciprocating fingers may be used in cooperation with any kind of pizza pressing head.

Advantageously, a vibrating disc may be positioned beneath and in contact with the base plate to improve the pressing operation.

The present invention also provides a process for forming a pizza shell which comprises supplying a dough mass onto a base plate positioned below a pizza pressing head, descending the pizza pressing head to form the dough into the pizza shell and reciprocating vertically and laterally a plurality of spaced fingers positioned around the circumference of the pressing head so that the lower ends press against the border of the pizza shell to imitate manual fingertip pressure.

The process may be carried out automatically wherein the dough pieces are fed consecutively onto a conveyor belt and pass beneath the pizza pressing head which descends to form them into the pizza shell and then ascends to enable the pizza shell to be transported away. In this case, the conveyor belt serves as the base plate.

The present invention is further described by way of example only with reference to the accompanying drawings.

BRIEF DESCRIPTION OF THE DRAWINGS

FIG. 1 is a diagrammatic side sectional view of a machine in its descended position.

FIG. 2 a section of a part of FIG. 1 looking in the direction of the arrows A—A.

DETAILED DESCRIPTION OF THE DRAWINGS

Referring to the drawings, the machine comprises a conveyor belt having a horizontally disposed surface 10, a base plate pizza pressing head 11, a hydraulic or pneumatic piston 12, a hub 13, a stop ring 14, conical disc 15, pivot ring 16, fingers 17, rubber band 18 and tension springs 19, 20, the tension spring 19 being stronger then tension spring 20. There is also shown a formed pizza shell 21 with a thick edge 22 having imitation manual fingertip depressions.

In operation, the conveyor belt 10 transporting a pizza dough mass stops at a position where the dough mass is beneath a base of the pizza pressing head 11. The pizza pressing head then descends together with the hub 13, stop ring 14, conical disc 15, pivot ring 16, fingers 17 and rubber band 18 until the lower edge of the rubber band 18 contacts the belt surface. The tension spring 19 ensures that the lower ends of the fingers descend outside the edge of the pressed dough, and the stop ring 14 is used to adjust how close to the conveyor belt surface the fingers should reach. At this stage, the dough is pressed slightly beyond the edge of the pressing head 11 (shown at X in FIG. 1) and stretches the rubber band 18 which as illustrated, is positioned between fingers 17 and pressing head 11, holds the dough within the finger area, and the conical disc 15 is at the position Y contacting the upper edge of the fingers 17. The conical disc then slides further downwards on the hub 13 to position Z and presses the upper edges of the fingers 17 outwards so that they pivot on the pivot ring 16 so that the lower edges of the fingers travel inwards towards the pressing head 11 contacting the surface of the conveyor belt 10 to press the outside edge of the dough held within the rubber band 18 towards the pressing head 11 to give the pizza shell 21 with a thick edge 22 having imitation fingertip depressions.

Afterwards, the conical disc 15 ascends to position Y, and the fingers 17 pivot by means of the more powerful tension spring 19 so that their lower ends move outwards. Finally, the pressing head 11, hub 13, stop ring 14, pivot ring 16, fingers 17 and rubber band 18 ascend, the conveyor restarts, and the cycle recommences.

I claim:

1. A machine for forming a pizza shell from a dough mass comprising a vertically reciprocating pizza pressing head positioned above a base plate and positioned around the circumference of the pressing head are a plurality of spaced fingers capable of reciprocating vertically and laterally, the lower ends of which are adapted to press against the border of a pizza shell on the base plate to imitate manual fingertip pressure.

2. A machine according to claim 1 further comprising an elastic band positioned around the circumference of the pizza pressing head, the lower edge of which contacts the base plate when the pressing head is in its descended position.

3. A machine according to claim 2 wherein the band is made of rubber.

4. A machine according to claim 1 further comprising a vibrating disc positioned beneath and in contact with the base plate.

5. A machine according to claim 1 wherein the machine is automatic with a conveyor belt serving as a base plate, adapted to pass beneath the pizza pressing head which is synchronised to descend to press the pizza dough mass into pizza shells.

6. A machine according to claim 5 wherein the conveyor belt is adapted to travel intermittently and the pizza pressing head is adapted to descend when the conveyor belt is stationary.

7. A machine according to claim 5 wherein the conveyor belt is adapted to travel continuously and the pizza pressing head is a flying pizza pressing head.

8. A machine for forming a pizza shell from a dough mass comprising a base plate having a horizontally disposed surface, a vertically reciprocable pressing head positioned above the base plate surface, a plurality of spaced-apart finger elements which are vertically and laterally reciprocable and positioned to surround the pressing head, and an elastic band positioned between the pressing head and finger elements so that when a dough mass positioned on the base plate has been pressed by the pressing head to form a pizza shell, the elastic band holds dough pressed beyond an edge of the base of the pressing head, and ends of the finger elements press a border of the shell to provide finger tip-type impressions in the shell border.

* * * * *

UNITED STATES PATENT AND TRADEMARK OFFICE
CERTIFICATE OF CORRECTION

PATENT NO. : 5,165,942
DATED : November 24, 1992
INVENTOR(S) : Lars G.A. WADELL

It is certified that error appears in the above-identified patent and that said Letters Patent is hereby corrected as shown below:

Column 2, line 15, after "a", insert --base plate--.

Column 2, line 17, delete "base plate".

Signed and Sealed this

Fifth Day of October, 1993

Attest:

BRUCE LEHMAN

Attesting Officer     Commissioner of Patents and Trademarks